(12) United States Patent
Kang

(10) Patent No.: US 7,873,272 B2
(45) Date of Patent: Jan. 18, 2011

(54) OPTICAL PULSE CHARACTERIZATION USING PHASE MODULATION

(75) Inventor: Inuk Kang, Matawan, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 982 days.

(21) Appl. No.: 11/559,015

(22) Filed: Nov. 13, 2006

(65) Prior Publication Data

US 2008/0114556 A1 May 15, 2008

(51) Int. Cl.
*H04B 10/04* (2006.01)
*G02F 1/01* (2006.01)

(52) U.S. Cl. .................. 398/25; 398/150; 398/202; 398/211

(58) Field of Classification Search .............. 398/150, 398/202, 211, 25
See application file for complete search history.

(56) References Cited

U.S. PATENT DOCUMENTS

| | | | | |
|---|---|---|---|---|
| 4,109,100 | A * | 8/1978 | Unkauf | 375/281 |
| 6,160,626 | A * | 12/2000 | Debeau et al. | 356/451 |
| 6,271,952 | B1 * | 8/2001 | Epworth | 398/147 |
| 6,542,723 | B1 * | 4/2003 | Tong et al. | 455/260 |
| 6,724,783 | B2 * | 4/2004 | Jalali et al. | 372/9 |
| 6,856,927 | B2 * | 2/2005 | Dorrer et al. | 702/76 |
| 6,885,490 | B2 * | 4/2005 | Dorrer et al. | 359/279 |
| 7,006,230 | B2 * | 2/2006 | Dorrer et al. | 356/451 |
| 7,126,739 | B2 * | 10/2006 | Dorrer et al. | 359/279 |
| 7,218,800 | B2 * | 5/2007 | Parker et al. | 385/11 |
| 7,277,645 | B2 * | 10/2007 | Gill et al. | 398/185 |
| 7,474,457 | B2 * | 1/2009 | Krausz et al. | 359/326 |
| 7,593,644 | B2 * | 9/2009 | Kaertner et al. | 398/154 |
| 2002/0130256 | A1 * | 9/2002 | Macki et al. | 250/227.21 |
| 2004/0257578 | A1 * | 12/2004 | Kane | 356/450 |

(Continued)

OTHER PUBLICATIONS

Christophe Dorrer, "Interferometric Techniques for the Characterization of Temporal Modulators", Dec. 2005, IEEE Photonics Technology Letters, vol. 17 No. 12.*

(Continued)

*Primary Examiner*—Ken N Vanderpuye
*Assistant Examiner*—Danny W Leung
(74) *Attorney, Agent, or Firm*—Mendelsohn, Drucker & Associates, P.C.

(57) ABSTRACT

An optical pulse monitor (OPM) that determines an optical phase profile for a pulse train by (i) modulating the optical phase of pulses in the pulse train using a periodic waveform and (ii) generating a derivative of a spectrum of the resulting modulated signal with respect to the waveform's amplitude. In one embodiment, an OPM has a phase modulator that modulates the optical phase of pulses in a received pulse train using a periodic waveform supplied by a configurable drive circuit. The drive circuit temporally aligns the waveform with the pulse train to serially produce each of four selected temporal alignments. An optical signal analyzer measures a spectrum of the modulated signal generated by the modulator for each of these four temporal alignments and provides the four measured spectra to a processor. The processor uses the measured spectra to determine two spectrum derivatives with respect to the waveform's amplitude. The processor samples each of the spectrum derivatives at frequency points separated from one another by the frequency of the periodic waveform and uses these samples to obtain a series of complex values. The processor then calculates the optical phase profile for the pulse train based on the phase of a complex value obtained by summing the series.

21 Claims, 6 Drawing Sheets

U.S. PATENT DOCUMENTS

2005/0286108 A1* 12/2005 Xu et al. .................. 359/278
2006/0232847 A1* 10/2006 Hirooka et al. ............ 359/237
2008/0114556 A1* 5/2008 Kang ........................ 702/76

OTHER PUBLICATIONS

Kang, I. Dorrer, C., "Novel method of optical pulse characterization using sinusoidal optical phase modulations", Publication Date: May 21-26, 2006, Lasers and Electro-Optics, 2006 and 2006 Quantum Electronics and Laser Science Conference. CLEO/QELS 2006. Conference on.*

C. Dorrer and I. Kang, "Real-Time Implementation of Linear Spectrograms for the Characterization of High Bit-Rate Optical Pulse Trains", Mar. 2004, IEEE Photonics Technology Letters, vol. 16, No. 3.*

"Signals and Systems", Haykin, 1999, pp. 401-403.*

"Simple Method for the Complete Characterization of an Optical Impulse," by Jean Debeau, et al., Optical Letters, vol. 23, No. 22, Nov. 1998, pp. 1784-1786.

"Milliwatt-Peak Power Pulse Characterization At 1.55 µm By Wavelength-Conversion Frequency-Resolved Optical Gating," by Pierre-Ambroise Lacourt et al., Optics Letters, vol. 27, No. 10, May 2002, pp. 863-865.

* cited by examiner

600

700

OPTICAL PULSE CHARACTERIZATION USING PHASE MODULATION

BACKGROUND OF THE INVENTION

1. Field of the Invention

The present invention relates to optical pulse characterization.

2. Description of the Related Art

Accurate characterization of an optical pulse, including the determination of its optical phase, is a nontrivial task in part because conventional photodetectors are not sensitive to the optical phase. At the same time, accurate determination of the optical phase is required to ensure proper encoding/decoding of various multi-level phase modulation formats, e.g., phase-shift keying (PSK) and quadrature-amplitude modulation (QAM). Several techniques have been demonstrated to be suitable for the characterization of the optical phase of relatively short optical pulses. Representative examples of such techniques can be found, e.g., in commonly owned U.S. Pat. Nos. 7,006,230, 6,885,490, and 6,856,927, all of which are incorporated herein by reference in their entirety. However, one problem with these techniques is that each of them is rather technically involved. For example, one of the techniques disclosed in U.S. Pat. No. 6,856,927 can determine an optical phase profile for a pulse train based on acquisition and processing of 32 different spectra.

SUMMARY OF THE INVENTION

Problems in the prior art are addressed by an optical pulse monitor (OPM) that determines an optical phase profile for a train of optical pulses by (i) modulating the optical phase of the pulses that make up the pulse train using a periodic waveform to produce a modulated signal and (ii) processing the spectrum of the modulated signal. Since the spectrum of the modulated signal is a function of the waveform's parameters, such as the waveform's amplitude and phase, a mathematical derivative of the spectrum can be determined with respect to a selected parameter by appropriately varying that parameter and monitoring changes in the spectrum. Using this property of the modulated signal, the OPM generates (A) one derivative of the modulated signal's spectrum with respect to the waveform's amplitude at a first selected value of the waveform's phase and (B) another derivative of the modulated signal's spectrum with respect to the waveform's amplitude at a second value of the waveform's phase that is separated from the first selected value by 90 degrees. Since each of the spectrum derivatives is a function of frequency, the OPM samples each spectrum derivative at frequency points separated from one another by the frequency of the periodic waveform and uses these samples to obtain a series of complex values, with each complex value having (a) as its real part, a sample of one of the spectrum derivatives and (b) as its imaginary part, the corresponding sample of the other spectrum derivative. The OPM then calculates the optical phase profile for the pulses in the pulse train based on the phase of a complex value obtained by summing the series of complex values.

In one embodiment, an OPM has a phase modulator that modulates the optical phase of pulses in a received pulse train using a periodic waveform supplied by a configurable drive circuit. The drive circuit temporally aligns the waveform with the pulse train to serially produce, at different points in time, each of four selected temporal alignments by incrementally shifting the phase of the waveform by 90 degrees. An optical signal analyzer measures a spectrum of the modulated signal generated by the modulator for each of these four temporal alignments and provides the resulting four respective measured spectra to a processor. The processor groups these four spectra into two pairs, with each pair characterized by a relative phase difference of 180 degrees. Since a phase shift of 180 degrees is equivalent to changing the sign of the waveform's amplitude, each pair of spectra corresponds to a mathematical increment of the waveform's amplitude equal to double the amplitude value. Consequently, the processor can determine a respective spectrum derivative with respect to the waveform's amplitude by calculating a difference spectrum for each of the respective pairs. Advantageously, the OPM can determine the optical phase profile for the received pulse train based on acquisition and processing of only four different spectra, whereas a comparable prior-art device similar to that described in the above-cited U.S. Pat. No. 6,856,927 when determining the same typically uses production of 32 spectra.

DETAILED DESCRIPTION

Figure 1A:
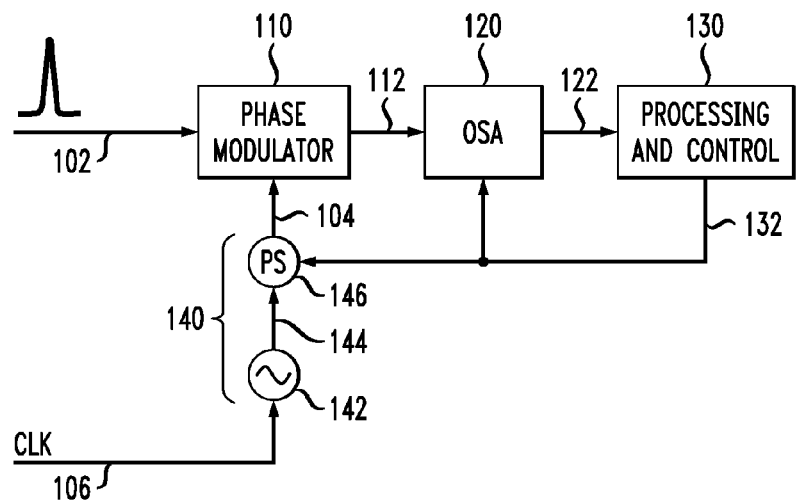
FIGS. 1A-C illustrate an optical pulse monitor (OPM) according to one embodiment of the invention.
Figure 1B:
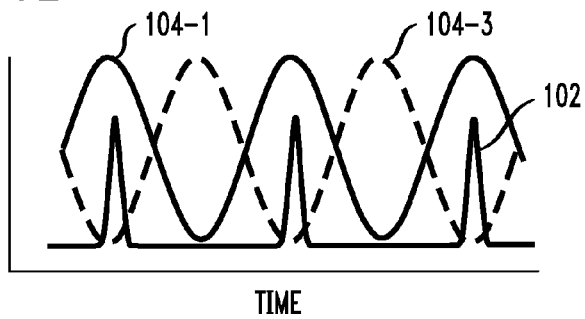
Figure 1C:
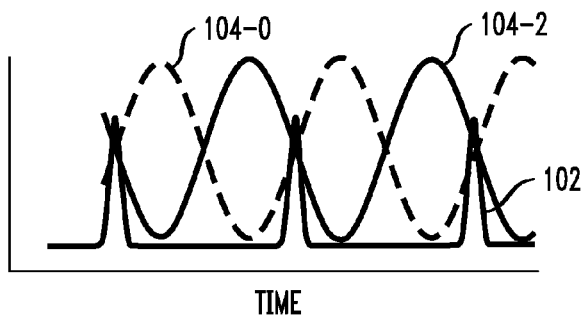

FIG. 1A-C illustrate an optical pulse monitor (OPM) 100 according to one embodiment of the invention. More specifically, FIG. 1A shows a block diagram of OPM 100, while FIGS. 1B-C graphically show a representative set of four temporal alignments that can be used for an optical input signal 102 applied to the OPM and a sine-wave drive signal 104 used in the OPM.

Input signal 102 carries a periodic train of optical pulses, the envelope of which is shown in FIGS. 1B-C. Signal 102 is applied to an optical phase modulator 110, which modulates the optical phase of signal 102 using drive signal 104, which is supplied by a drive circuit 140. Drive circuit 140 has a signal generator 142 and a programmable phase shifter (PS) 146. Generator 142 is configured to generate a sine-wave drive signal 144, which becomes drive signal 104 after being phase-shifted in PS 146. In one configuration, signal 144 is synchronized with (i.e., has the same frequency as and a fixed phase with respect to) a reference clock (CLK) signal 106 applied to generator 142, while the clock signal is synchronized with the pulse-train envelope of signal 102. Clock signal 106 can be obtained as known in the art, e.g., by appropriately processing signal 102 or using the drive signal applied to a pulse carver (not shown) used for the generation of signal 102. An exemplary clock recovery circuit that can be used for the generation of clock signal 106 based on signal 102 is described, e.g., in commonly owned U.S. Pat. No. 6,542,723, which is incorporated herein by reference in its entirety. In another configuration, signal 144 can have a frequency that is an integer multiple of the pulse repetition rate in signal 102.

A control signal 132 generated by a processing and control unit (PCU) 130 configures PS 146 to consecutively go, in any selected order, through a set of four different configurations characterized by four different relative phase offsets $\alpha_k$ for signal 104, where $\alpha_k=\pi k/2$ and k=0, 1, 2, 3. One representative set of four temporal alignments for signals 102 and 104 corresponding to these four configurations is graphically shown in FIGS. 1B-C. Curves 104-1 and 104-3 in FIG. 1B show the two PS configurations corresponding to k=1 and k=3, respectively. In these two PS configurations, the maxima or minima of sine-wave signal 104 are temporally aligned with the optical-pulse maxima in signal 102. Similarly, curves 104-0 and 104-2 in FIG. 1C show the two PS configurations corresponding to k=0 and k=2, respectively. In these two PS configurations, the positive or negative inversion points of sine-wave signal 104 are temporally aligned with the optical-pulse maxima in signal 102. Note that other temporal alignments for signals 102 and 104, in which signal 102 is shifted by any fixed amount with respect to the temporal position indicated in FIGS. 1B-C, can also be used.

Control signal 132 also configures an optical spectrum analyzer (OSA) 120, which receives an optical output signal 112 produced by modulator 110, to measure the spectrum of that output signal for each of the four PS configurations graphically indicated in FIGS. 1B-C. OSA 120 outputs the measured spectra via signal 122 to PCU 130 for analysis. PCU 130 processes the received spectra as described in more detail below to obtain (i) the temporal intensity profile of signal 102 and (ii) the temporal profile of the optical phase for that signal.

The electric field of signal 102, E(t), can be expressed as follows:

$$E(t) = \frac{1}{2\pi}\int E(\omega)e^{-i\omega t}d\omega = \frac{1}{2\pi}\int \sqrt{I(\omega)}\exp[i\varphi(\omega)]e^{-i\omega t}d\omega \quad (1a)$$

where t is time; $\omega$ is optical frequency; and E($\omega$) is the Fourier transform of E(t), which being a complex value is equivalently expressed using the spectral intensity I($\omega$)=E($\omega$)E*($\omega$) and the spectral phase $\phi(\omega)$, where $$E(\omega)=\sqrt{I(\omega)}\exp i\phi(\omega) \quad (1b)$$

The phase modulation, $\phi(t)$, imparted by modulator 102 is described by the phase-modulation waveform of Eq. (2):

$$\phi(t)=\psi \sin(\Omega t+\alpha_k) \quad (2)$$

where $\Omega$ is the modulation frequency and $\psi$ is the modulation amplitude. Using Eq. (2), the Fourier transforms, $E_\psi^k(\omega)$, of the electric field of signal 112 corresponding to the four PS configurations graphically shown in FIGS. 1B-C can be expressed as follows:

$$E_\psi^{(0,2)}(\omega)=\int\exp[\pm i\psi \sin(\Omega t)]E(t)e^{i\omega t}dt \quad (3a)$$

$$E_\psi^{(1,3)}(\omega)=\int\exp[\pm i\psi \cos(\Omega t)]E(t)e^{i\omega t}dt \quad (3b)$$

For a small $\psi$, two derivatives of $I_\psi^k(\omega)(=E_\psi^k(\omega)E_\psi^k(\omega)^*)$ over $\psi$ for k=0 and k=1 can be approximated by Eq. (4):

$$\left.\frac{dI_\psi^{(0)}(\omega)}{d\psi}\right|_{\psi=0} \approx \frac{I_\psi^{(0)}(\omega)-I_\psi^{(2)}(\omega)}{2\psi} \quad (4a)$$

$$\left.\frac{dI_\psi^{(3)}(\omega)}{d\psi}\right|_{\psi=0} \approx \frac{I_\psi^{(3)}(\omega)-I_\psi^{(1)}(\omega)}{2\psi} \quad (4b)$$

Note that the right part of Eq. (4) contains the four spectra measured by OSA 120 in the four PS configurations graphically shown in FIGS. 1B-C.

Defining a new quantity $\Delta(\omega)$ as:

$$\Delta(\omega) \equiv \left.\frac{dI_\psi^{(3)}(\omega)}{d\psi}\right|_{\psi=0} + i\left.\frac{dI_\psi^{(0)}(\omega)}{d\psi}\right|_{\psi=0} \quad (5)$$

and using Eqs. (3-4), one finds that $\Delta(\omega)$ can be expressed as:

$$\Delta(\omega)=i[E(\omega+\Omega)E^*(\omega)-E(\omega)E^*(\omega-\Omega)] \quad (6)$$

Using Eq. (6), one can also obtain a quantity $\Delta(\omega-m\Omega)$, where m is a positive integer, which is expressed as follows:

$$\Delta(\omega-m\Omega)=i[E(\omega-(m-1)\Omega)E^*(\omega-m\Omega)-E(\omega-m\Omega)E^*(\omega-(m+1)\Omega)] \quad (7)$$

Combining Eqs. (6-7), one finds that, for E($\omega$) with finite spectral content, the following is true:

$$\sum_{m=0}^{\infty}\Delta(\omega-m\Omega)=iE(\omega+\Omega)E^*(\omega) \quad (8)$$

Using the relation between E($\omega$) and spectral intensity I($\omega$) and phase $\phi(\omega)$ given by Eq. (1b), Eq. (8) can be transformed into Eq. (9a):

$$\sqrt{I(\omega+\Omega)I(\omega)}\exp i[\varphi(\omega+\Omega)-\varphi(\omega)]=-i\sum_{m=0}^{\infty}\Delta(\omega-m\Omega) \quad (9a)$$

or equivalently into Eq. (9b):

$$\sqrt{I(\omega+\Omega)I(\omega)}\exp i[\varphi(\omega+\Omega)-\varphi(\omega)]=i\sum_{m=1}^{\infty}\Delta(\omega+m\Omega) \quad (9b)$$

Each of Eqs. (9a-b) gives a relationship between two complex numbers, one on the left-hand side and the other on the right-hand side. The complex number on the right-hand side can be determined by measuring $I_\psi^k(\omega)$ and then using Eqs. (4a-b) and (5) to calculate $\Delta(\omega)$ and thus the sums present in the right-hand sides of Eqs. (9a-b). Then, the equality of two complex numbers dictates that the phase angle of the right-hand side be equal to the phase angle of the left-hand side. According to Eqs. (9a-b), the latter is $\phi(\omega+\Omega)-\phi(\omega)$. With the knowledge of $\phi(\omega+\Omega)-\phi(\omega)$, $\phi(\omega)$ can be determined recursively, with $\Omega$ serving as a recursive increment.

After $\phi(\omega)$ has been determined, Eq. (1b) can be used to calculate E($\omega$). In one implementation, I($\omega$), which is also used in Eq. (1b) for calculating E(ω), can be obtained by turning off modulator 110 and measuring the spectrum of signal 112, which, in the absence of modulation, is substantially equivalent to I(ω). In an alternative implementation, I(ω) can be obtained without turning off modulator 110 and, instead, calculating I(ω) from the already measured spectra using one or both of the approximations provided by Eq. (10):

$$I(\omega) \approx \frac{I_\psi^{(1)}(\omega) + I_\psi^{(3)}(\omega)}{2} \approx \frac{I_\psi^{(0)}(\omega) + I_\psi^{(2)}(\omega)}{2} \quad (10)$$

By performing a Fourier transform defined by Eq. (1a) on the calculated E(ω), one can obtain the electric field in the time domain, E(t). Finally, the temporal intensity and phase profiles of signal 102 can be extracted from E(t), e.g., as follows:

$$I(t) = E(t)E^*(t) \quad (11)$$

$$\phi(t) = Arg(E(t)) \quad (12)$$

Figure 2:
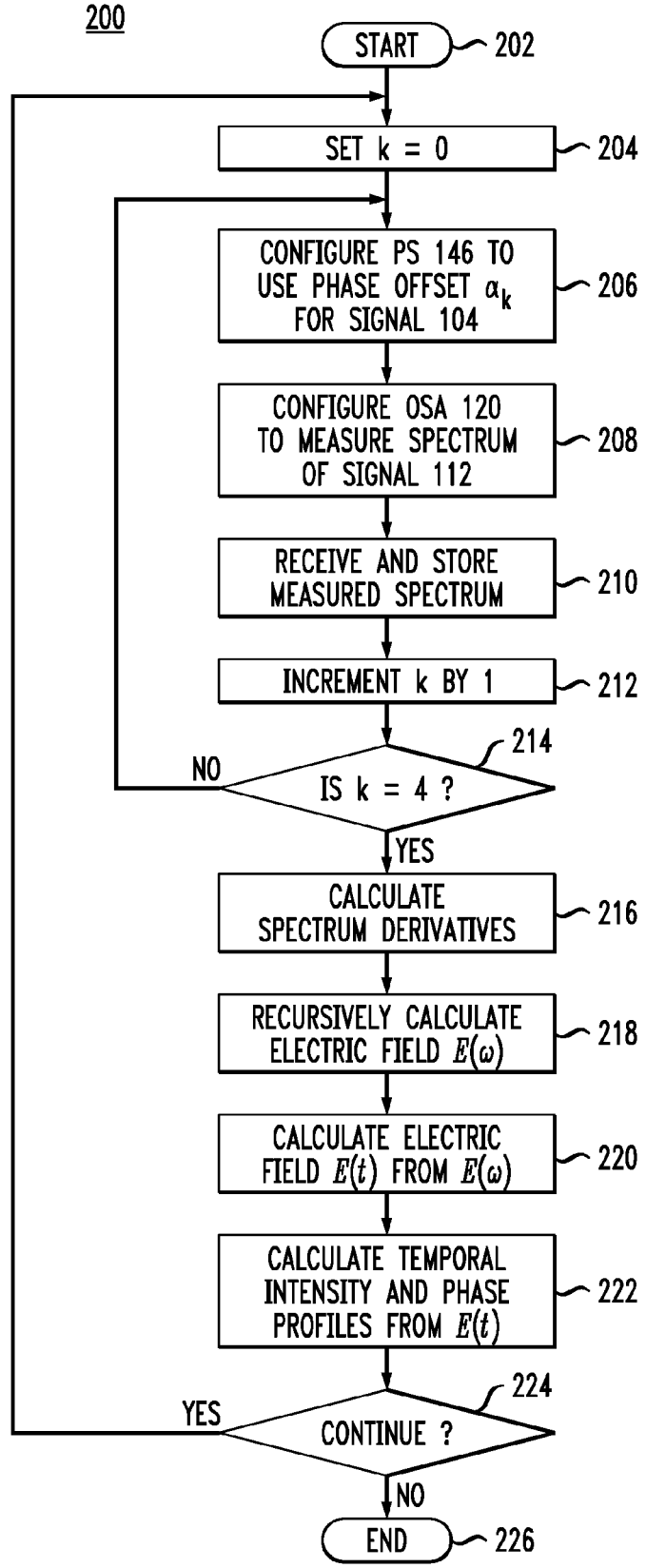
FIG. 2 shows a flowchart of a processing and control method that can be used by the processing and control unit (PCU) in the OPM of FIG. 1 according to one embodiment of the invention.

FIG. 2 shows a flowchart of a processing and control method 200 that can be used by PCU 130 according to one embodiment of the invention. More specifically, method 200 implements an algorithm generally described by Eqs. (1-12). For illustration purposes, method 200 is described in reference to the set of temporal alignments shown in FIGS. 1B-C. One skilled in the art will appreciate that method 200 can similarly be used for other selected temporal alignments.

Method 200 begins at step 202, where OPM 100 is turned on and PCU 130 is brought online. In step 204, PCU 130 sets the value of k to zero. In step 206, PCU 130 uses control signal 132 to configure PS 146 to use phase-shift $\alpha_k$ while transforming signal 144 into signal 104. Since the current value of k is zero, the temporal alignment of signal 104 with signal 102 corresponds to that indicated by curve 104-0 in FIG. 1C. In step 208, PCU 130 further uses control signal 132 to configure OSA 120 to measure the spectrum of signal 112 and output the measurement result via signal 122 to the PCU. In step 210, PCU 130 receives and stores the measured spectrum for further processing in steps 216-218. In step 212, PCU 130 increments the current value of k by one.

After comparing, in step 214, the current value of k with 4, PCU 130 returns the processing of method 200 to step 206. Consequently, PCU 130 repeats steps 206-212 three more times for k=1, 2, and 3, respectively. When, in the last instance of step 212, the value of k becomes k=4, PCU 130 has sequentially acquired four spectra of signal 112 corresponding to the four temporal alignments of signal 104 with signal 102 indicated by curves 104-0, 104-1, 104-2, and 104-3, respectively, in FIGS. 1B-C. With the current value of k being four, the execution of step 214 now directs the processing of method 200 to step 216 instead of returning it back to step 206.

In step 216, PCU 130 calculates spectrum derivatives, e.g., as specified by Eqs. (4a-b). In step 218, PCU 130 further calculates electric field E(ω) using (i) the stored spectra of signal 112, (ii) the recursive phase relation provided by Eqs. (9a-b), and (iii) spectrum I(ω) obtained using Eq. (10). In step 220, PCU 130 calculates electric field E(t) by Fourier transforming, as specified in Eq. (1a), the calculated electric field E(ω). Finally, in step 222, PCU 130 extracts the temporal intensity and phase profiles for signal 102 from the calculated E(t), e.g., as specified by Eqs. (11-12).

In step 224, PCU 130 can configure OPM 100 to continuously monitor the pulse-train characteristics of input signal 102. More specifically, if such continuous monitoring is desired, then the processing of method 200 is directed from step 224 back to step 204, thereby causing PCU 130 to repeat steps 204-222 as described above. Alternatively, if such continuous monitoring is not desired, then the processing of method 200 is directed from step 224 to step 226, where signal monitoring is terminated and PCU 130 is brought offline.

Note that method 200 relies on an implicit assumption that the pulse-train characteristics of signal 102 remain relatively stable during the sequential acquisition of the four spectra of signal 112 corresponding to k=0, . . . , 3. Depending on the particular embodiment of OPM 100 configured to run method 200, this sequential acquisition will typically take anywhere between about 1 ms and 10 s. As a result, care should be taken in selecting an appropriate embodiment of OPM 100 having an acquisition period commensurate with the type of signal fluctuations in the optical system that is being monitored.

Figure 3A:
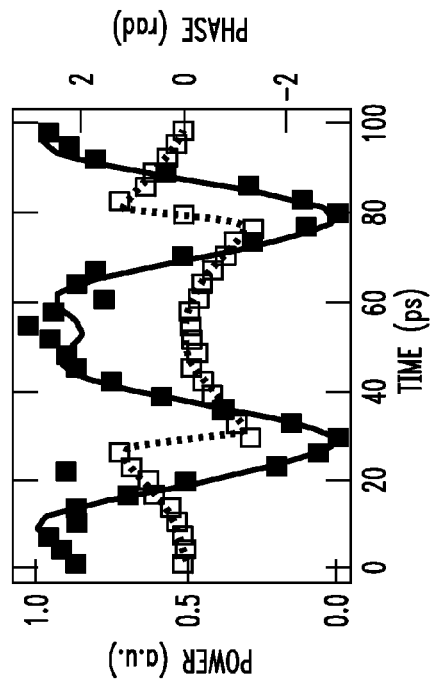
FIGS. 3A-B graphically compare pulse-train characterization data obtained using the OPM of FIG. 1 with those obtained using a representative prior-art characterization device.
Figure 3B:
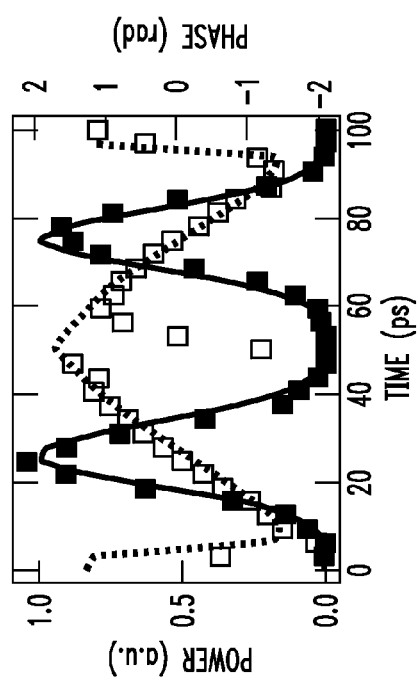

FIGS. 3A-B graphically compare pulse-train characterization data obtained using OPM 100 with those obtained using a representative prior-art characterization device. More specifically, the prior-art device that was used to obtain the data shown in FIG. 3 is that disclosed in the above-cited U.S. Pat. No. 6,856,927. The optical signal (analogous to signal 102), which is characterized in FIGS. 3A-B, was generated using a lithium niobate Mach-Zehnder modulator driven by a 10-GHz radio-frequency drive signal. The modulator was biased to induce relatively large chirps as evident in FIGS. 3A-B. For the generation of the optical signal corresponding to FIG. 3A, the modulator was driven to produce alternating-phase 33% duty-cycle pulses. Similarly, for the generation of the optical signal corresponding to FIG. 3B, the modulator was driven to produce alternating-phase 67% duty-cycle pulses. A second lithium niobate modulator was used as phase modulator 110 in OPM 100, and the amplitude of the phase modulation (ψ, see Eq. (2)) imparted by that second modulator was about 0.7.

In FIGS. 3A-B, the solid lines represent the intensity profile data obtained using OPM 100, and the solid squares represent the intensity profile data obtained using the prior-art device. Similarly, the dashed lines represent the optical temporal phase profile data obtained using OPM 100, and the empty squares represent the optical temporal e phase profile data obtained using the prior-art device. As can be seen in FIGS. 3A-B, OPM 100 and the prior-art device produce practically coinciding data. However, OPM 100 uses only four different modulations as opposed to 32 or more different modulations used by the prior-art device.

Figure 4:
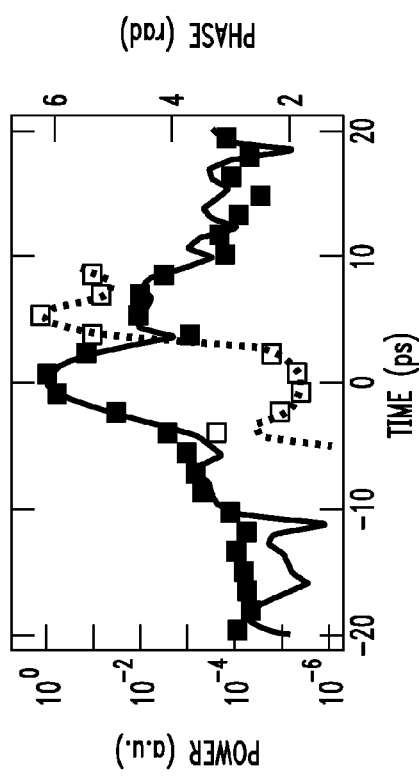
FIG. 4 graphically compares pulse-train characterization data obtained using the OPM of FIG. 1 with those obtained using the prior-art characterization device used for FIG. 3.

FIG. 4 graphically compares pulse-train characterization data obtained using OPM 100 with those obtained using the prior-art characterization device used for FIG. 3. The optical signal characterized in FIG. 4 was generated using an actively mode-locked semiconductor laser configured to generate ~2-ps pulses at a repetition rate of $10^{10}$ pulses/s. The data legend in FIG. 4 is the same as that in FIGS. 3A-B. Again, as in the case of FIGS. 3A-B, good agreement between the pulse characterization data obtained with OPM 100 and the prior-art device is evident.

Figure 5A:
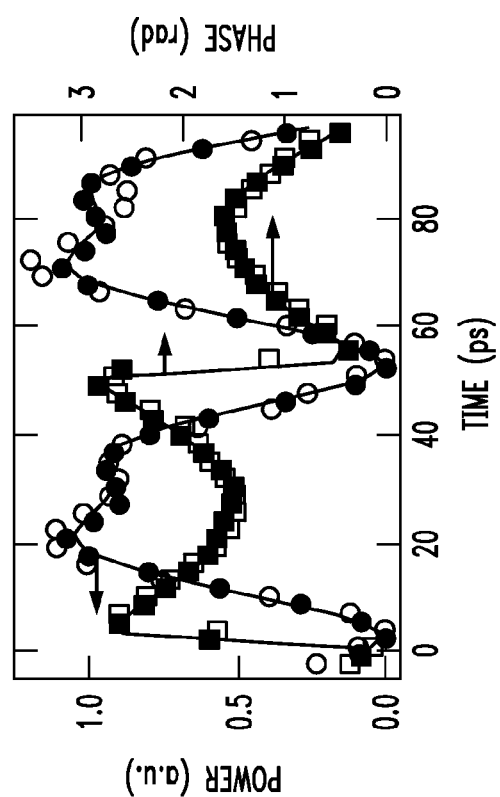
FIGS. 5A-B graphically illustrate power sensitivity for the OPM of FIG. 1.
Figure 5B:
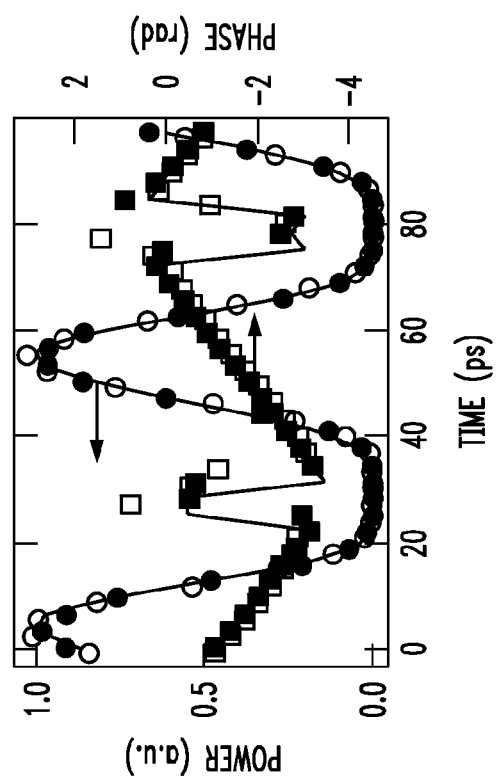

FIGS. 5A-B graphically illustrate power sensitivity of OPM 100. More specifically, the optical signals characterized in FIGS. 5A-B were generated using the same experimental setups as those corresponding to FIGS. 3A-B, respectively. In FIGS. 5A-B, the lines represent the data obtained at signal power of about 50 μW; the solid symbols represent the data obtained at signal power of about 1 μW; and the empty symbols represent the data obtained at signal power of about 100 nW. As can be seen in FIGS. 5A-B, OPM 100 produces practically identical results in a power range between about 50 μW and 100 nW, which indicates a dynamic range of at least about 30 dB.

Figure 6:
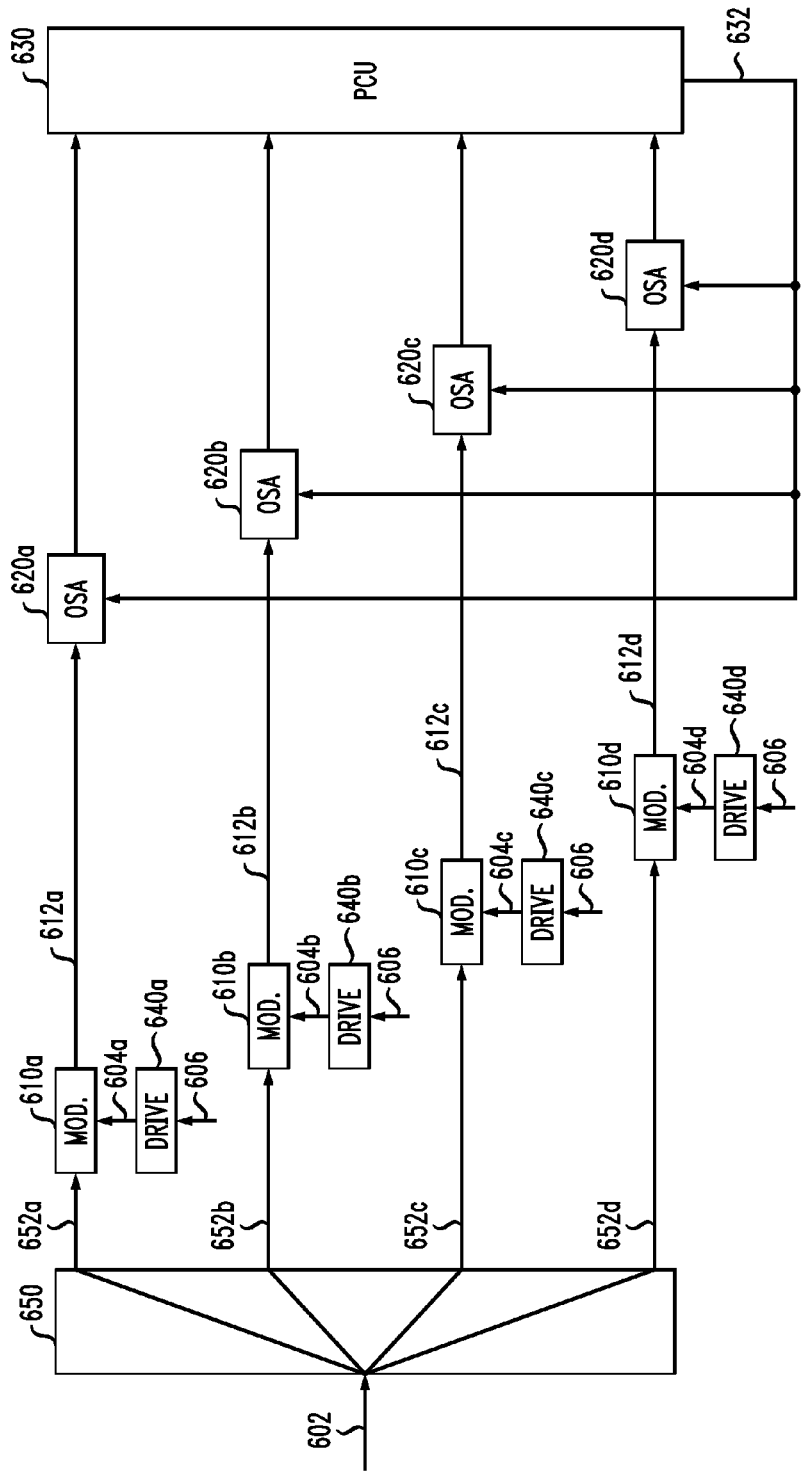
FIG. 6 shows a block diagram of an OPM according to another embodiment of the invention.

FIG. 6 shows a block diagram of an OPM 600 according to another embodiment of the invention. Similar to OPM 100 of FIG. 1, OPM 600 generally relies on the algorithm described by Eqs. (1-12). However, instead of performing sequential acquisition of the spectra corresponding, e.g., to the configurations graphically shown in FIGS. 1B-C, as OPM 100, OPM 600 is designed to perform parallel acquisition of those spectra. As such, OPM 600 has a splitter 650 configured to split an optical input signal 602 into four (attenuated) copies 652a-d. Each of those copies is then phase-modulated in a respective phase modulator 610 to produce a respective signal 612.

Each modulator 610 is substantially analogous to modulator 110 of FIG. 1 and is driven by a corresponding dedicated drive circuit 640. Each drive circuit 640 is configured to generate a respective sine-wave drive signal 604 based on a reference clock signal 606, which is analogous to reference clock signal 106 of FIG. 1. However, different drive circuits 640 generate their respective drive signals 604 so that each of these signals has a different relative phase with respect to reference clock signal 606. For example, in one configuration, the relative phases of signals 604a-d are 0, π/2, π, and 3π/2, respectively. As a result, for the set of four temporal signal alignments illustrated in FIGS. 1B-C, modulators 610b and 610d have the temporal signal alignments indicated by curves 104-1 and 104-3, respectively, and modulators 610a and 610c have the temporal signal alignments indicated by curves 104-0 and 104-2, respectively.

OPM 600 has four OSAs 620a-d, each of which is analogous to OSA 120 of FIG. 1. A control signal 632 generated by a PCU 630 configures each of OSAs 620a-d to measure the spectrum of the respective one of signals 612a-d, which spectrum is then provided to the PCU for analysis. As a result, PCU 630 acquires in parallel the four spectra analogous to those acquired sequentially by PCU 130. PCU 630 then processes the four acquired spectra in a manner, e.g., analogous to that of steps 216-222 in method 200. Due to the parallel acquisition of the four spectra of signals 652 corresponding to k=0, . . . , 3, OPM 600 has a shorter acquisition and processing period than that of OPM 100. As a result, OPM 600 can be used to characterize optical pulse trains subjected to faster profile changes than optical pulse trains suitable for the characterization using OPM 100.

Figure 7A:
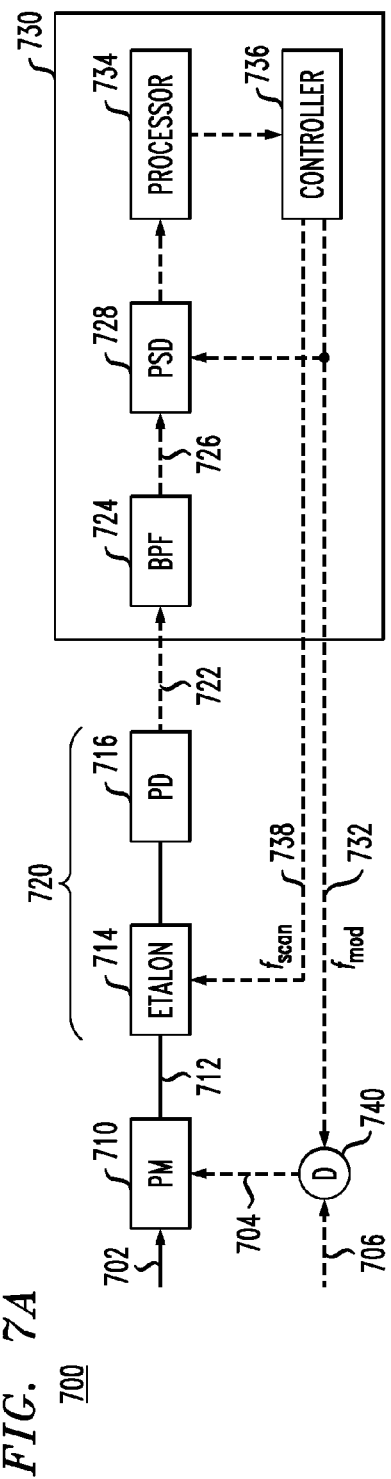
FIGS. 7A-B illustrate an OPM according to yet another embodiment of the invention.
Figure 7B:
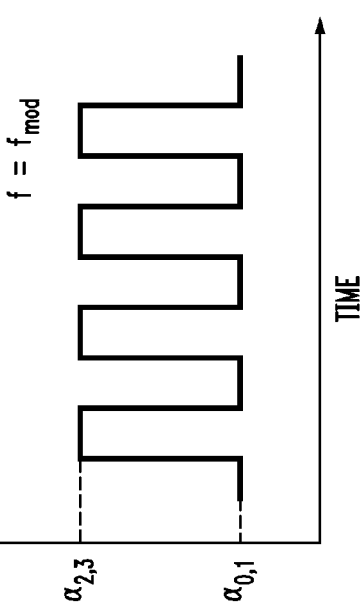

FIGS. 7A-B illustrate an OPM 700 according to yet another embodiment of the invention. More specifically, FIG. 7A shows a block diagram of OPM 700, and FIG. 7B graphically shows a representative modulation-switching configuration for that OPM. Similar to OPM 100 of FIG. 1, OPM 700 generally relies on the algorithm described by Eqs. (1-12). However, one difference between OPMs 100 and 700 is that the former uses sequential acquisition of the spectra expressed by Eqs. (3a-b) followed by the difference spectra calculation expressed by Eqs. (4a-b), while the latter uses electronic synchronous (lock-in) detection to directly measure the difference spectra expressed by Eqs. (4a-b).

An input signal 702 carrying a periodic train of optical pulses is applied to an optical phase modulator (PM) 710, which is analogous to modulator 110 of FIG. 1. Modulator 710 modulates the optical phase of signal 702 based on a drive signal 704 supplied by a drive circuit (D) 740. Drive circuit 740 is configured to generate drive signal 704 based on (i) a reference clock signal 706, which is analogous to reference clock signal 106 of FIG. 1, and (ii) a control signal 732 generated by a processing and control unit (PCU) 730.

Control signal 732 can configure drive circuit 740 to operate in two different modulation-switching configurations. In the first modulation-switching configuration, drive circuit 740 switches, with frequency $f_{mod}$, the phase offset $\alpha_k$ of drive signal 704 between $\alpha_0$ and $\alpha_2$ as shown in FIG. 7B. Similarly, in the second modulation-switching configuration, drive circuit 740 switches the phase offset $\alpha_k$ of drive signal 704 between $\alpha_1$ and $\alpha_3$. (Note that FIG. 7B intends to show the relative values of the two phase offsets used in each particular modulation-switching configuration and, as such, does not imply that $\alpha_0=\alpha_1$ or that $\alpha_2=\alpha_3$.) An optical output signal 712 produced by modulator 710 driven by signal 704 is received by an optical frequency-resolving device 720 having an optical etalon 714 and a photodetector 716. Etalon 714 has a relatively narrow (e.g., about 0.02 nm) transmission band, which can be scanned over a spectral region of interest at frequency $f_{scan}$ specified by a control signal 738 generated by PCU 730. In a representative configuration, $f_{mod}=300$ kHz and $f_{scan}=20$ Hz.

At an optical frequency (wavelength) selected by etalon 714, the spectral intensity of signal 712 measured by photodetector 716 oscillates at modulation frequency $f_{mod}$ (i) between $I_\psi^{(0)}(\omega)$ and $I_\psi^{(2)}(\omega)$ in the first modulation-switching configuration and (ii) between $I_\psi^{(1)}(\omega)$ and $I_\psi^{(3)}(\omega)$ in the second modulation-switching configuration. A resulting electrical output signal 722 produced by photodetector 716 is filtered by a band-pass filter (BPF) 724 having a pass band located at about frequency $f_{mod}$. A filtered signal 726 produced by BPF 724 has a component ($S_{726}$) that is synchronous with the signal modulating the phase offset at frequency $f_{mod}$ (see FIG. 7B), which component can be expressed using Eq. (13):

$$S_{726} = \frac{2}{\pi}(I_\psi^{(0,1)} - I_\psi^{(2,3)})\cos(2\pi f_{mod} t) \qquad (13)$$

A phase-sensitive detector (PSD) 728 measures component $S_{726}$ using, e.g., a conventional lock-in detection technique, and supplies the measurement result to a signal processor 734. Processor 734 then extracts from component $S_{726}$ the difference $I_\psi^{(0,1)} - I_\psi^{(2,3)}$ for the wavelength selected by etalon 714. Processor 734 also appropriately configures a controller 736, which generates control signals 732 and 738 for drive circuit 740 and etalon 714, respectively. A copy of control signal 732 is also applied to PSD 728, which uses that copy as a reference signal for lock-in detection of signal 726.

By continuously extracting the difference $I_\psi^{(0,1)} - I_\psi^{(2,3)}$ while the position of the transmission band of etalon 714 is being scanned over the wavelength range of interest, processor 734 is able to construct a derivative spectrum expressed by Eq. (4a) or (4b). More specifically, in the first modulation-switching configuration, processor 734 constructs the derivative spectrum expressed by Eq. (4a). Similarly, in the second modulation-switching configuration, processor 734 constructs the derivative spectrum expressed by Eq. (4b). After these two derivative spectra have been constructed, processor 734 completes the characterization of signal 702 by executing processing steps that are analogous to steps 218-222 of method 200.

While this invention has been described with reference to illustrative embodiments, this description is not intended to be construed in a limiting sense. Although, the approximations expressed by Eqs. (4a-b) were described in reference to modulation amplitudes $\psi \ll 1$, these approximations work well up to about $\psi \approx 1$ without causing significant errors in the pulse-train characterization results. Although embodiments of the present invention have been described in reference to OPM 100 having one signal processing branch employing one reconfigurable drive circuit 140 or OPM 600 having four signal processing branches employing four fixedly configured drive circuits 640, other embodiments having different numbers of signal processing branches are also possible. For example, in one embodiment, an OPM of the invention could have two signal processing branches employing two reconfigurable drive circuits, which would achieve partial parallelization of the acquisition process and enable that OPM to have a shorter acquisition and processing time than that of OPM 100. Any suitable frequency-resolving device can be used in place of OSA 120, OSA 620, or device 720. Phase modulation without a phase lock between signals 602 and 606 is potentially possible if all of the four spectra measured by OSAs 620*a-d* are acquired within a period of time shorter than the time interval between two successive optical pulses. Although embodiments of the invention have been described in reference to relative phase offsets $\alpha_k$ being 0, 90, 180, and 270, random deviation of each $\alpha_k$ from the respective specified value within a range of about 5 degrees (or sometimes even greater than 5 degrees) produces pulse characterization data of acceptable quality. Furthermore, optical phase-modulation waveforms other than a pure sinusoid can also be used. Various modifications of the described embodiments, as well as other embodiments of the invention, which are apparent to persons skilled in the art to which the invention pertains are deemed to lie within the principle and scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

I claim:

1. A method of optical signal monitoring, comprising the steps of:
    modulating, using an optical modulator, the optical phase of pulses in a pulse train using a periodic waveform having an amplitude to generate a modulated signal; and
    generating two derivatives of a spectrum of the modulated signal with respect to said amplitude sampling each of the spectrum derivatives at frequency points separated from one another by a frequency of the periodic waveform to generate a plurality of sample values;
    generating a series of complex values, wherein, for each of said complex values, the real part is a respective sample value of one of the spectrum derivatives and the imaginary part is a corresponding sample value of the other spectrum derivative; and
    calculating an optical phase profile in the frequency domain for the pulses in the pulse train based on the phase of a complex value obtained by summing a plurality of complex values from the series.

2. The invention of claim 1, further comprising the step of measuring one or more spectral components of the modulated signal to generate said spectrum.

3. The invention of claim 1, wherein:
    the periodic waveform has a fixed phase relative to an envelope of the pulse train; and
    the spectrum of the modulated signal is a function of the amplitude and the fixed phase.

4. The invention of claim 1, wherein the periodic waveform is a sinusoid.

5. The invention of claim 1, wherein the step of generating comprises:
    for each of four selected temporal alignments between the pulse train and the periodic waveform, measuring a respective spectrum of the modulated signal, wherein relative phase offsets for the periodic waveforms corresponding to three of the four selected temporal alignments with respect to the periodic waveform corresponding to the remaining one of the four selected temporal alignment are substantially $\pi/2$, $\pi$, and $3\pi/2$.

6. The invention of claim 5, wherein the step of generating two derivatives comprises:
    measuring a spectrum of the modulated signal for a first temporal alignment;
    shifting the phase of the periodic waveform to produce a second temporal alignment;
    measuring a spectrum of the modulated signal for the second temporal alignment;
    further shifting the phase of the periodic waveform to produce a third temporal alignment;
    measuring a spectrum of the modulated signal for the third temporal alignment;
    further shifting the phase of the periodic waveform to produce a fourth temporal alignment; and
    measuring a spectrum of the modulated signal for the fourth temporal alignment.

7. The invention of claim 5, wherein:
    the step of modulating comprises:
        generating two or more copies of the pulse train; and
        modulating the optical phase of pulses in each copy using a respective periodic waveform to generate a respective modulated signal, wherein the temporal alignment between a pulse-train copy and the respective periodic waveform differs from the temporal alignment between at least one other pulse-train copy and that other copy's respective periodic waveform; and
    the step of generating two derivatives comprises measuring in parallel spectra of the two or more modulated signals corresponding to said two or more copies.

8. The invention of claim 5, wherein:
    the step of modulating comprises oscillating the relative phase offset between two selected phase offset values at an oscillation frequency; and
    the step of generating two derivatives comprises synchronously detecting a spectral component of the modulated signal at said oscillation frequency.

9. The invention of claim 8, wherein the step of generating two derivatives further comprises changing the wavelength of the spectral component being synchronously detected.

10. The invention of claim 1, further comprising the step of:
    calculating electric field of the pulse train in the time domain based on (i) the optical phase profile in the frequency domain and (ii) spectral intensity of the modulated signal.

11. The invention of claim 10, further comprising the step of:
    calculating the optical phase profile in the time domain based on the calculated electric field in the time domain.

12. Apparatus for optical signal monitoring, comprising:
    a modulator adapted to modulate the optical phase of pulses in a pulse train using a periodic waveform having an amplitude to generate a modulated signal;
    a frequency-resolving device adapted to measure one or more spectral components of the modulated signal; and a processor adapted to (i) generate two derivatives of a spectrum of the modulated signal with respect to said amplitude based on said measured one or more spectral components of the modulated signal; (ii) sample each of the spectrum derivatives at frequency points separated from one another by a frequency of the periodic waveform to generate a plurality of sample values; (iii) generate a series of complex values, wherein, for each of said complex values, the real part is a respective sample value of one of the spectrum derivatives and the imaginary part is a corresponding sample value of the other spectrum derivative; and (iv) calculate an optical phase profile in the frequency domain for the pulses in the pulse train based on the phase of a complex value obtained by summing a plurality of complex values from the series.

13. The invention of claim 12, wherein:
the periodic waveform has a fixed phase relative to an envelope of the pulse train; and
the spectrum of the modulated signal is a function of the amplitude and the fixed phase.

14. The invention of claim 12, wherein the periodic waveform is a sinusoid.

15. The invention of claim 12, further comprising:
a configurable drive circuit adapted to (i) generate the periodic waveform and (ii) shift the phase of said periodic waveform to achieve a selected temporal alignment between the pulse train and the periodic waveform in response to a command from the processor.

16. The invention of claim 15, wherein the drive circuit is adapted to lock the phase of the periodic waveform relative to an envelope of the pulse train.

17. The invention of claim 15, wherein:
the drive circuit is adapted to oscillate the phase of said periodic waveform between two selected phase offset values at an oscillation frequency;
the processor comprises a phase sensitive detector adapted to synchronously detect a spectral component of the modulated signal at said oscillation frequency; and
the frequency resolving device comprises an etalon adapted to change the wavelength of the spectral component being synchronously detected by the phase sensitive detector in response to a command from the processor.

18. The invention of claim 12, comprising:
a splitter adapted to generate two or more copies of the pulse train; and
two or more instances of the modulator, each adapted to modulate the optical phase of a respective pulse-train copy using a respective periodic waveform to generate a respective modulated signal, wherein temporal alignment between the pulse-train copy and the periodic waveform differs from temporal alignment between at least one other pulse-train copy and that other copy's respective periodic waveform; and
two or more instances of the frequency-resolving device adapted to measure in parallel spectra of the two or more modulated signals corresponding to said two or more copies.

19. The invention of claim 12, wherein the processor is adapted to calculate electric field of the pulse train in the time domain based on (i) the optical phase profile in the frequency domain and (ii) spectral intensity of the modulated signal.

20. The invention of claim 19, wherein the processor is adapted to calculate the optical phase profile in the time domain based on the calculated electric field in the time domain.

21. Apparatus for optical signal monitoring, comprising:
a modulator adapted to modulate the optical phase of pulses in a pulse train using a periodic waveform having an amplitude to generate a modulated signal;
a frequency-resolving device adapted to measure one or more spectral components of the modulated signal;
a processor adapted to (i) generate a derivative of a spectrum of the modulated signal with respect to said amplitude based on said measured one or more spectral components of the modulated signal and (ii) determine an optical phase profile for the pulses in the pulse train based on said derivative; and
a configurable drive circuit adapted to (i) generate the periodic waveform and (ii) shift the phase of said periodic waveform to achieve a selected temporal alignment between the pulse train and the periodic waveform in response to a command from the processor, wherein:
the drive circuit is adapted to oscillate the phase of said periodic waveform between two selected phase offset values at an oscillation frequency;
the processor comprises a phase sensitive detector adapted to synchronously detect a spectral component of the modulated signal at said oscillation frequency; and
the frequency resolving device comprises an etalon adapted to change the wavelength of the spectral component being synchronously detected by the phase sensitive detector in response to a command from the processor.

* * * * *